United States Patent [19]

Ojima

[11] Patent Number: 4,934,984
[45] Date of Patent: Jun. 19, 1990

[54] TENSIONER DEVICE FOR BELT OR CHAIN DRIVES

[75] Inventor: Juji Ojima, Aikawa, Japan
[73] Assignee: NHK Spring Co., Ltd., Yokohama, Japan
[21] Appl. No.: 399,570
[22] Filed: Aug. 24, 1989
[51] Int. Cl.⁵ .............................................. F16H 7/08
[52] U.S. Cl. .................................... 474/111; 474/138
[58] Field of Search ...................... 474/101, 109–111, 474/113–117, 133, 135, 136, 138

[56] References Cited

U.S. PATENT DOCUMENTS 4,702,726 10/1987 Ojima et al. ................. 474/138 X
4,722,720 2/1988 Ojima et al. ................. 474/138 X Primary Examiner—Thuy M. Bui
Attorney, Agent, or Firm—Fleit, Jacobson, Cohn, Price, Holman & Stern

[57] ABSTRACT

A tensioner device is provided with a rotary body energized the rotation by a spring and an urged body restricted the rotation by a bearing are inserted into a casing in a screwed state.

The inner part of the casing is tightly closed by being covered with a bellows between the above casing and the urged body, and the torque of the rotary body is converted into a propelling force in a rod direction.

In this case, an excess in pressurized air which compensates the change of an inner pressure caused by propelling of the urged body, is sealed within the casing.

5 Claims, 3 Drawing Sheets

TENSIONER DEVICE FOR BELT OR CHAIN DRIVES

BACKGROUND OF THE INVENTION

This invention relates to a tensioner which provides a fixed tension to a chain or a timing belt which drives a cam shaft or an engine of an autocycle or a vehicle.

A tensioner such as a chain tensioner, a belt tensioner or the like is used for maintaining a fixed tension by urging the chain or the belt in a fixed direction when the chain or the belt slackens by extension or friction thereof during the use.

FIG. 6 shows a conventional tensioner disclosed in U.M. laid open No. 62 (1987)-19015. The main parts thereof are constituted by:

a cylindrical casing 1 secured approximately vertically with bolt holes 11a, 11a for fixing, a rotary body 2 having a shaft rotatively inserted into the casing 1, an urging body 3 which propels by rotation of the rotary body 2 screwed with a male screw portion 2a formed at the top end portion to the rotary body 2, a spring (torsion spring) 4 which provides a torque to the rotary body 2 outwardly inserted therethrough, and a bearing 5 which performs a restrictive rotation of the urged body 3 fixed to the casing 1 having a non-circular bearing hole which penetrates the urged body 3.

When the urged body 3 abuts against the chain, belt or the like in a state wherein the rotation energy is storaged in the spring by rotating the rotary body 2 in such a constitution, the rotary body 2 rotates by aid of the spring 4 and the torque is transmitted to the urged body 3.

However, since the urged body 3 is restricted the rotation thereof by the bearing 5, the torque of the urged body 3 converts to a propelling power to urge the chain, belt or the like. By this, the chain or the belt can be maintained a fixed tension without deflection of the chain, belt or the like.

In such a tensioner, in order to prevent the invasion of dusts and the like into the casing 1 or the leakage of lubricating oil filled therein, the inner portion of the casing 1 must be tightly closed. For this purpose, the base portion (lower end portion) of the casing is screwed with seal bolts 7, and an elastic bellows 6 is covered between the top end portion (upper end portion) of the casing and the urged body 3 which propels and drives. The top end of such bellows 6 is secured to the urged body 3 with a spring band 8, and the lower end portion thereof is connected with a cap 9 forcibly inserted into the casing 1 to close between the urged body 3 and the casing 1. An air-escaping hole 11 having a "T" type is formed to the urged body 3 positioning at the upper portion of the bellows 6. The air-escaping hole 11 is formed at a position higher than the liquid surface of the lubricating oil within the casing 1 to connect the inner portion of the casing 1 and the outer portion thereof. The air-escaping hole 11 prevents a negative pressure due to the change of volume within the casing according to propelling of the urged body 3. By this, the propelling of the urged body 3 can be securely performed.

Further, the numeral 10 in FIG. 6 is a stopper which locks the propelling of the urged body 3 and is removed properly after installing the tension.

In the conventional tensioner, there necessitates an air-escaping hole 11 which prevents a negative pressurization of the inside of the casing 1. Therefore, there exists a limit in an attaching direction of the tensioner. In other words, it is necessary to prevent the discharge of the inner lubricating oil outwards through the air-escaping hole 11. For this purpose, it is necessary to provide the air-escaping hole 11 in a vertical direction positioned at an upper portion or in a slightly inclined direction. Accordingly, it is not only impossible to provide it in a horizontal direction, but also the attached position is defined. Further, the same consideration is necessary in conveyance and packing, and inconvenient in treatment. Furthermore, even if such consideration is taken, there often occurs the leakage of the lubricating oil from the air-escaping hole 11 by the expansion and the vibration due to the rise of the temperature and a sufficient measure against the oil leakage can not be taken.

SUMMARY OF THE INVENTION

This invention is characterized in that in a device wherein a rotary body energized to revolve with spring and an urged body restricted the rotation by a bearing are inserted into a casing in a screwed state, said casing being covered with bellows between the casing and the urged body to tightly close the inside of the casing thereby converting the torque of the rotary body to a propelling power in an axial direction of the urged body, an excess of pressurized air which compensates a change of the inner pressure caused by the propulsion of the urged body is sealed within the casing.

In the above constitution, a volume change within the casing occurs by the propulsion of the urged body. However, since the change of the inner pressure due to the volume change is compensated by excess of pressurized air sealed in the casing, the pressure within the casing does not become a negative pressure.

DETAILED DESCRIPTION OF THE INVENTION

The preferred embodiment of this invention will be described hereinafter reference to the accompanying drawings.

Figure 1:
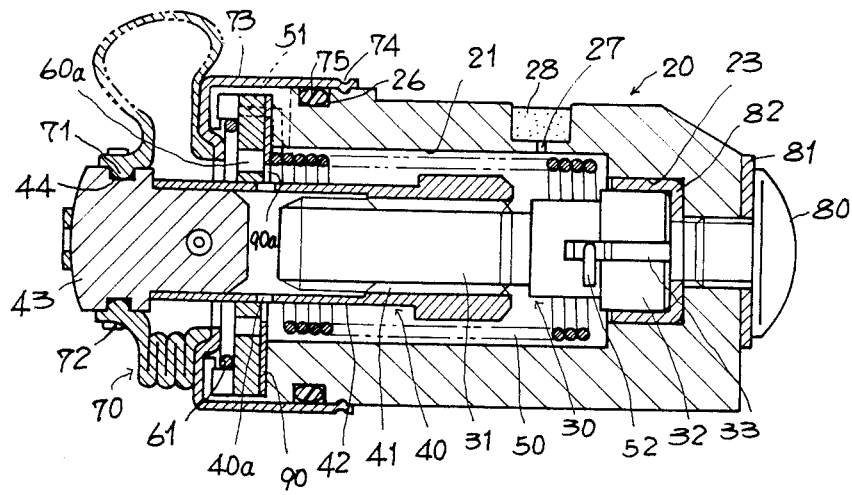
FIG. 1 is a longitudinal sectional view of an example of this invention.
Figure 2:
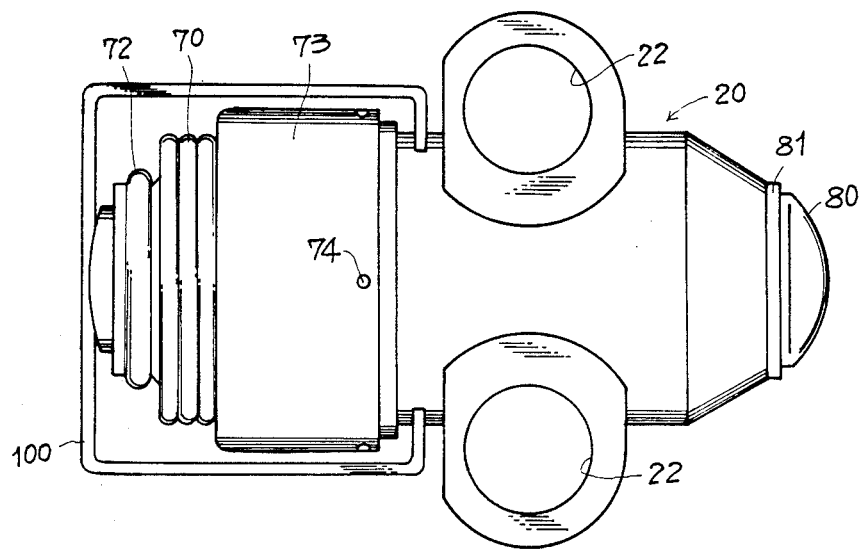
FIG. 2 and FIG. 3 are a plan view and a side view respectively.
Figure 3:
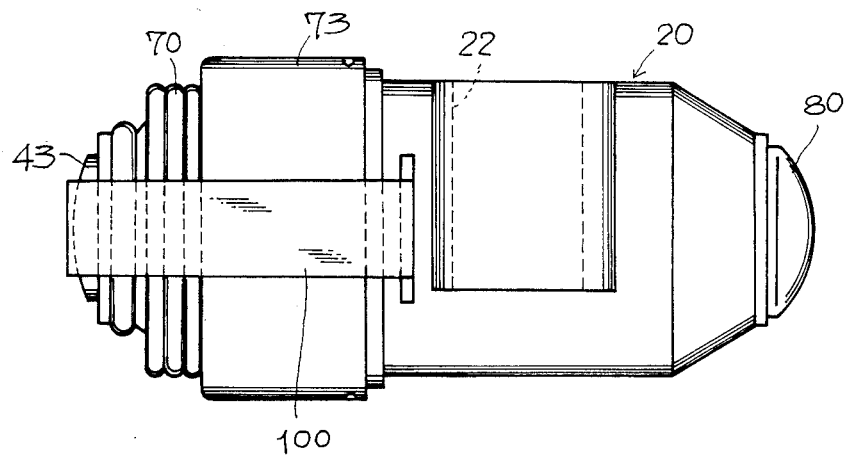

FIG. 1, FIG. 2 and FIG. 3 indicate a whole constitution of an example of this invention. The tensioner is provided with a casing 20 wherein a cavity portion 21 in an axial direction is formed, a rotary body 30 and an urged body 40 inserted into the cavity portion 21 of the casing 20 in a screwed state, a spring (torsion spring) 50 which provides a torque to the rotary body 30 a bearing 60 which restricts the rotation of the urged body 40 attached to the top end (left end portion in FIG. 1) of the casing, and an elastic bellows 70 which covers between the casing 20 and the urged body 40.

The casing 20 is attached to an engine or the like (not shown). Accordingly, an attached hole 22 is formed at the outside thereof. Further, a seal bolt 80 is screwed with a base end portion (right end portion in FIG. 1) through a packing 81 whereby the base end side is maintained to be airtight. Furthermore, a pouring hole 27 having a small diameter is provided at the trunk portion of the casing 20 to connect the inner portion of the casing 20 with the outer portion thereof. This pouring hole 27 is a hole into which an excess of a pressurized air is poured, said hole being closed by inserting an elastic sealing plug 28 capable of being restored to the original state at the upper portion of the pouring hole 26 after the assembly of the tensioner.

The rotary body 30 is releasably and rotatively supported within the casing 20. The rotary body 30 is formed by continuously connecting a male screw portion 31 at the top end side thereof and a rod portion 32 at the base end side, said male screw portion 31 being screw with the urged body 40 to transmit the torque. The rod portion 32 is adapted to support the rotation by releasably supported within a supporting concave 23 of the casing 20. In this case, a cylindrical supporting member 82 having a bottom is provided between the rod portion 32 and the casing. The supporting member 82 is interposed between the rotary body 30 and the casing 20, thereby supporting the rotation of the rotary body 30. Since the supporting of the rotation of the rotary body 30 is performed smoothly and securely by interposing the supporting member 82 as such, there is no need of a high accurate working to the supporting concave 23 of the casing 20 and the friction of the rotary body and the casing 20 can be prevented. Further, a split slit 33 in an axial direction is formed at the rod portion 32 of the rotary body 30, said split slit 33 being latched with the spring 50 to energizes the rotation.

The urged body 40 is provided with a pipe portion 42 wherein a female screw portion 41 is formed at the inner surface thereof and a push shaft 43 inserted into the top end of the portion 42. The pipe portion 42 is screwed with the male screw portion 31 of the rotary body whereby the torque of the rotary body 30 is transmitted thereto, and converts the torque of the rotary body 30 to a propelling force by being inserted into the bearing 60 in a restrictive state of the rotation. On the other hand, the top end portion of the push shaft 43 projects outwards from the casing 20, and the top end surface thereof abuts against the chain or the belt directly, or through an urged roller. By this, the tension of the chain or the belt is maintained.

The spring 50 is inserted outwardly into such urged body 40 and the rotary body 30. The spring 50 is inserted outwardly to the urged body 40 and the rotary body 30 when they are in a screwed state, said outwardly inserted portion being constructed to be a triple construction of the rotary body 30, the urged body 40 and the spring 50 from inside to the outside. Such triple construction has a merit wherein even if the length of the urged body in a movement direction is shortened, a stroke of the urged body 40 can be secured sufficiently. By this, one end 51 of the spring 50 is bendingly formed to be approximately letter "L" type to intend to latch with casing 20, and another end 52 is inserted into a split slit 33 of the rotary body 30 to intend to latch with the rotary body 30. Accordingly, when the rotary body 30 is allowed to rotate by inserting a driver or the like into the split slit 33 from the outside of the casing 20 in a state wherein the seal bolt 80 is removed, a rotation energy can be storaged in the spring 50. Further, although the end portion 52 of the rotary body side of the spring 50 is bent in a diameter direction of the rotary body 30 after being inserted into the split slit of the rotary body 30, the displacement of the spring 50 at the operation time can be obstructed by such bending, thereby being able to secure a stable operation of the spring 50.

Figure 4:
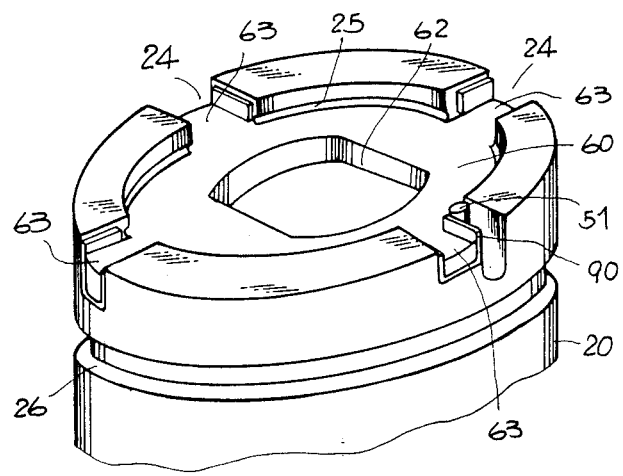
FIG. 4 and FIG. 5 are a perspective view which shows a securing construction of a bearing and a sectional view thereof.
Figure 5:
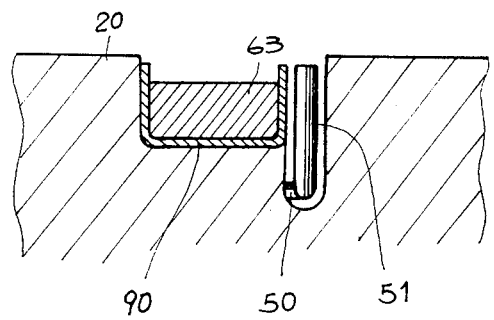
Figure 6:
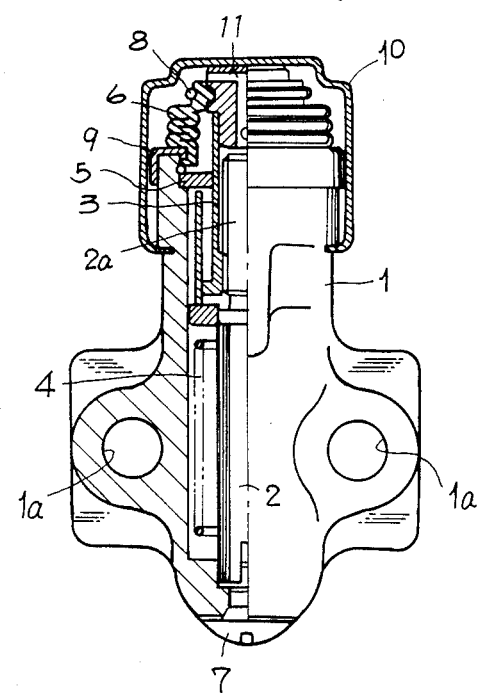
FIG. 6 is a conventional sectional view.

The bearing 60 restricts the rotation of the urged body 40 and is secured to the top end portion of the casing 20 being prevented from drawing out by a circlip. FIG. 4 and FIG. 5 indicate the bearing 60 and the securing construction thereof. The bearing 60 is provided with a bearing hole 62 at the intermediate portion and latching pieces 63 at the intervals of 90° at the outside thereof respectively. The bearing hole 62 is formed to be approximately an ellipse shape wherein both sides of the circle thereof are cut to be parallel, said bearing hole 62 being allowed to insert the pipe portion 42 of the urged body 40 having the same outer shape as the bearing hole 62 therethrough whereby the rotation of the urged body 40 is restricted. On the other hand, the latching pieces 63 restrict the rotation against the torque of the rotary body 30. For this purpose, latching grooves 24 are formed at an interval of 90° at the top end surface of the casing corresponding to the latching groove 63 and the above rotation is restricted by inserting the latching piece 63 to the latching groove 24. In this case, the depth of latching groove 24 of the casing 20 is larger than that of the latching piece 63 and the bearing 60 is secured in a slightly receded state than the top end surface of the casing 20. At the inner surface projected more than the bearing 60 is provided with a clip groove 25 wherein the circlip 61 is inserted therein.

Further, a spacer 90 is interposed between the bearing 60 and casing 20. Although the spacer 90 is interposed at the oppositely contact portion between the bearing 60 and the casing 20, especially a position corresponding to each latching piece 63 of the bearing 60 is bendingly formed like a "10" shape so as to enclose each latching piece 63, thereby being interposed between the latching piece 63 and the latching groove 24 of the casing 20. In the spacer 90 having such construction, since the urged force of the latching piece 23 due to the torque of the rotary body 30 transmitted through the urged body 40 is prevented with a wide breadth surface of the spacer 90 from the direct to the casing 20, the friction of the end surfaces of the latching piece 63 and the groove 24 of the casing 20 can be prevented. By the use of the spacer 90 to the bearing 60 and of the supporting member 82 of the rotary body 30 as such, the use of aluminum and synthetic resins inferior in antifriction can be used as a casing 20. Even in this case, the friction of the casing 20 at the attached portion of the bearing of the tension and the rod supporting portion of the rotary body 30 is prevented whereby a stable operation and the decrease of the weight can be attained. Further, in one part of the latching groove 24 in the casing 20, one end 51 of the spring 50 is drawn out and the latching with the casing 20 described above is intended.

Then, the bellows 70 is bridged between the push shaft 43 of the urged body 40 and the casing 20 to cover between these. The end portion at the side of the urged body 40 in the bellows 70 is formed a convex portion 71 at the inner side thereof, said convex portion 71 being inserted into a concave portion 44 formed at the outer surface of the push shaft 43 corresponding to the convex portion 71. And the end portion of the urged body 40 side is tightly closed by winding a garter spring 72 from the outer side. On the other hand, the end portion of the casing side is connected to a cap 73 attached to the casing 20. Further, this connection can be performed by a suitable means such as adherence, welding and the like. The cap 73 is made of approximately a cylindrical hard material having an inner diameter approximately equal to the outer diameter of the casing 20 at the base side and bending the top end thereof towards the inner side slightly, said cap 73 being attached to the casing 20 by caulking a fixed position on the periphery of the cap 73 after outwardly inserting the base side into the casing 20. The bellows 70 is connected to the bending position at the top end of the cap 73. Further, a surrounding groove 26 is formed at the outer surface of the casing 20, said surrounding groove 26 being wound with the seal ring 75. The seal ring 75 consists of an elastic body and when the cap 73 is secured to the casing in a wound state around the periphery groove 26, this is closely contacted with the inner face of the cap 73 and the outer surface of the casing 20 to close tightly between them.

By this, the invasion of dusts from outside and the leakage of the lubricating oil sealed within the casing 20 are prevented. In the construction using such seal ring 75, the air-tight between cap 73 and the casing 20 can be performed securely. Accordingly, there is no need of pressurizing of the cap for maintenance of the air-tight at the attached portion of the cap 73 and also no need of a high dimension accuracy for pressurizing.

By this, the working becomes easy and increases the productivity.

In addition to the above constitution, the urged body 40, the bearing 60 and the spacer 90 are provided openings of circulating circuits of the lubricating oil 40a, 60a and 90a respectively at each suitable position, whereby a uniform circulation of the lubricating oil filled within the casing 20 is possible through each circulating circuit 40a, 60a, and 90a. Accordingly, in the casing 20 each member is continuously connected through the circulating circuit 40a, 60a, and 90a and the change of the inner volume due to the propelling of the urged body 40 is transmitted to each member as a change of an inner pressure. This invention is to seal an excess of pressurized air which compensates the change of the inner pressure into the casing 20. This excess of pressurized air is attained by pouring a pressurized air having a fixed pressure or a normal pressure air into the casing 20. The pouring hole 27 formed at the trunk of the casing 20 is for pouring this excess of pressurized air and an injection needle (not shown) is pierced through a sealing plug 28 in a state wherein the sealing cork 28 is inserted therein to insert the top end thereof to the pouring hole 27 thereby being able to pour the excess of pressurized air. The poured excess of pressurized air is storaged in the bellows 70 portion by being allowed to expand an elastic bellows 70 as shown in the upper half portion in FIG. 1. In such condition, even if the urged body 40 propels to more and occurs the volume change within the casing 20, the pressure within the case 20 is maintained always at a fixed pressure because the change of the inner pressure due to the volume change is compensated. Accordingly, there is no need of providing an air-escaping hole to the urged body 40 and the inner part of the casing 20 becomes a perfect sealing state which prevents the leakage of the lubricating oil. Accordingly, the attaching direction of the tensioner can select freely in either direction of a horizontal direction or a lower direction and the freedom of the attachment is not only enlarged but also the treatment of conveyance and packing becomes easy. Further, the lubricating oil does not leak even by vibration or expansion due to rise of the temperature. Furthermore, the injection needle is drawn out from the sealing plug 28 after pouring the excess air. However, after drawn out, the sealing plug 28 restores due to the elasticity and the pierced portion of the injection needle is sealed again. Accordingly, the leakage of the lubricating oil or the excess of pressurized air can be prevented.

The numeral 100 in FIG. 2 and FIG. 3 is a stopper which locks the propelling of the urged body 40 prior to the assembling of the tensioner. This stopper 100 is removed after assembling.

In this invention, since the excess of pressurized air which compensates the change of the inner pressure due to the propelling of the urged body is previously sealed in the casing, the pressure in the casing can be maintained not to become a negative pressure. From this reason, there is no need of providing an air-escaping hole and the inner part of the casing can be closed tightly. Therefore, an attaching direction and an attaching position can be selected freely and the freedom of the design is larged.

Further, the hole for pouring the excess of pressurized air is sealed with an elastic sealing plug. After pouring an air, the sealing plug is restored to seal the pouring hole thereby preventing the leakage of the lubricating oil and the excess of the pressurized air.

Furthermore, since the mechanism portion consisting of the spring, the urged body and the rotary body consitutes a triple construction wherein the rotary body and the spring are respectively arranged at the inside and the outside thereof in a same rod state, and the urged body is screwed with the rotary body so as to position between the rotary body and the spring. Accordingly, even if the length of device in a go-and-back direction of the urged body is shortened, the stroke of the urged body can secured sufficiently, thereby being able to make a whole device compactly.

Further, since the spacer is interposed between the bearing and the casing, the torque of the rotary body transmitted to the bearing is catched by a wide surface of the spacer, the friction of the bearing and the casing is prevented.

By this, it is possible to construct the casing by aluminum, synthetic or the like inferior in antifriction, thereby being able to intend to decrease the weight.

Furthermore, by forming a circulation circuit of the lubricating oil of the urged body, the bearing and the spacer, a uniform circulation of the lubricating oil filled in the casing is possible, whereby a smooth operation of each construction member can be secured.

What I claim is;

1. A tensioner device wherein a rotary body energized the rotation with a spring and an urged body restricted the rotation by a bearing inserted into a casing in a screwed state, an inner part of the casing is tightly closed by being covered with a bellows between the casing and the urged body, and the torque of the rotary body is converted into a propelling force in a rod direction: said tensioner device containing an excess of pressurized air which compensates the change of an inner pressure caused by propelling of the urged body is sealed within the casing.

2. A tensioner device according to claim 1 wherein a hole for pouring the excess of pressurized air sealed with an elastic sealing plug is boared in the casing.

3. A tensioner device according to claim 1 wherein a mechanism portion is a triple construction consisting of a spring, an urged body and a rotary body, said rotary body and the spring being arranged respectively at the inside and the outside thereof in a same rod state, and said urged body being screwed with the rotary body so as to position between the rotary body and the spring.

4. A tensioner device according to claim 1 wherein the spacer is interposed at an oppositely contacted portion of the bearing and the casing.

5. A tensioner device according to claim 4 wherein a circulating circuit of the lubricating oil is formed to the urged body, the bearing and the spacer.

* * * * *